United States Patent
Okada et al.

(10) Patent No.: US 10,320,445 B2
(45) Date of Patent: Jun. 11, 2019

(54) COMMUNICATION SYSTEM AND CONNECTOR

(71) Applicants: AutoNetworks Technologies, Ltd., Yokkaichi-shi, Mie (JP); Sumitomo Wiring Systems, Ltd., Yokkaichi-shi, Mie (JP); Sumitomo Electric Industries, Ltd., Osaka-shi, Osaka (JP); Toyota Jidosha Kabushiki Kaisha, Toyota-shi, Aichi (JP)

(72) Inventors: Ryo Okada, Yokkaichi (JP); Takeshi Hagihara, Yokkaichi (JP); Ryo Tanaka, Osaka (JP); Nobuyuki Nakagawa, Toyota (JP); Kengo Hayashizaki, Toyota (JP)

(73) Assignees: AutoNetworks Technologies, Ltd., Yokkaichi-shi, Mie (JP); Sumitomo Wiring Systems, Ltd., Yokkaichi-shi, Mie (JP); Sumitomo Electric Industries, Ltd., Osaka-shi, Osaka (JP); Toyota Jidosha Kabushiki Kaisha, Toyota-shi, Aichi (JP)

( * ) Notice: Subject to any disclaimer, the term of this patent is extended or adjusted under 35 U.S.C. 154(b) by 92 days.

(21) Appl. No.: 15/526,235

(22) PCT Filed: Nov. 6, 2015

(86) PCT No.: PCT/JP2015/081283
§ 371 (c)(1),
(2) Date: May 11, 2017

(87) PCT Pub. No.: WO2016/076216
PCT Pub. Date: May 19, 2016

(65) Prior Publication Data
US 2017/0331520 A1   Nov. 16, 2017

(30) Foreign Application Priority Data

Nov. 14, 2014   (JP) .................................. 2014-232036

(51) Int. Cl.
H04B 3/56        (2006.01)
H04L 25/03       (2006.01)
(Continued)

(52) U.S. Cl.
CPC .............. *H04B 3/56* (2013.01); *B60L 11/123* (2013.01); *H02J 7/1446* (2013.01);
(Continued)

(58) Field of Classification Search
USPC ........................................................ 320/104
See application file for complete search history.

(56) References Cited

U.S. PATENT DOCUMENTS

2006/0104000 A1*   5/2006  Yuhara ................... H02H 9/005
                                                              361/93.1
2011/0094075 A1*   4/2011  Lee ...................... B60L 11/1805
                                                               29/25.41
(Continued)

FOREIGN PATENT DOCUMENTS

EP           2790329 A1     10/2014
JP         2013-187850 A     9/2013
(Continued)

OTHER PUBLICATIONS

"Surface Vehicle Recommended Practice", J1772 Feb. 2012, Society of Automotive Engineers, Inc., Oct. 1996 (Revised version, Feb. 2012).
(Continued)

*Primary Examiner* — Bryce M Aisaka
(74) *Attorney, Agent, or Firm* — Honigman LLP

(57) ABSTRACT

A communication system comprising: a control line transmitting a control signal for controlling charging of a battery
(Continued)

mounted on a vehicle; a reference potential line connected to a reference potential of the vehicle serving as a reference for the control signal; a first PLC communication device connected to the control line and the reference potential line and superposing onto the control signal a differential signal having a higher frequency than the control signal so as to perform communication with an external power supply apparatus; and an inductive element which is provided at a point of connection between the reference potential line $1c$ and the reference potential or provided in the reference potential line and the inductive element having impedance for a noise having a higher frequency than the control signal is higher than the impedance for the control signal.

7 Claims, 10 Drawing Sheets

(51) Int. Cl.
| | | |
|---|---|---|
| *B60L 11/12* | (2006.01) | |
| *H02J 7/14* | (2006.01) | |
| *H04L 25/02* | (2006.01) | |

(52) U.S. Cl.
CPC ........ *H02J 7/1492* (2013.01); *H04L 25/0276* (2013.01); *H04L 25/03* (2013.01)

(56) References Cited

U.S. PATENT DOCUMENTS

| | | |
|---|---|---|
| 2014/0192910 A1 | 7/2014 | Okada et al. |
| 2015/0061584 A1 | 3/2015 | Okada et al. |
| 2015/0161500 A1 | 6/2015 | Kim et al. |

FOREIGN PATENT DOCUMENTS

| | | |
|---|---|---|
| JP | 2013-215059 A | 10/2013 |
| WO | 2013/008903 A1 | 1/2013 |

OTHER PUBLICATIONS

Search Report for International Application No. PCT/JP2015/081283, dated Jan. 26, 2016, 2 pp.

Extended European Search Report dated Sep. 20, 2017 issued in European Patent Application No. 15859137.0.

* cited by examiner

COMMUNICATION SYSTEM AND CONNECTOR

CROSS-REFERENCE TO RELATED APPLICATIONS

This application is the national phase under 35 U.S.C. § 371 of PCT International Application No. PCT/JP2015/081283 which has an International filing date of Nov. 6, 2015 and designated the United States of America, which claims priority of Japanese Patent Application No. JP 2014-232036 filed Nov. 14, 2014.

FIELD

The present invention relates to a communication system in which a control line transmitting a control signal for controlling charging of a battery of a vehicle and a reference potential line connected to a reference potential of the vehicle are employed so that a differential signal is superposed on the control signal and thereby communication with an external power supply apparatus is achieved. Further, the present invention relates to a connector constituting the communication system.

BACKGROUND

Spreading are: plug-in hybrid electric vehicles (PHEVs) employing an electric motor and a combustion engine in combination; and electric vehicles (EVs) driven by an electric motor without employing a combustion engine. A vehicle such as a plug-in hybrid electric vehicle and an electric vehicle includes a battery driving the electric motor. Then, charging of the battery is performed by using an external power supply apparatus installed in an electricity supply station, an ordinary house, or the like.

FIG. 10 is a block diagram illustrating the configuration of a vehicle connected to a power supply apparatus. A power supply apparatus 2 includes a charging cable 3 whose end is provided with a charging gun to be connected to a vehicle 1001. The vehicle 1001 includes a connector 11 to which the charging gun is to be connected. Thus, with a user connects the charging gun to the connector 11, the power supply apparatus 2 is allowed to be connected to the vehicle 1001. The charging cable 3 includes: two power feed lines 1001a and 1001b; a reference potential line 1001c; a control line 1001d; and a connection detection line (not illustrated) detecting the connection of the charging gun. The power feed lines 1001a and 1001b are connected to a charging device 12 mounted on the vehicle 1001. The reference potential line 1001c is connected through the charging device 12 to the reference potential. For example, the reference potential is a body ground of the vehicle 1001. The power supply apparatus 2 supplies an alternating current through the power feed lines 1001a and 1001b to the charging device 12. Then, the charging device 12 converts the supplied alternating current into a direct current and then performs charging of the battery 10. The control line 1001d is connected through a PLC communication device 1014 to a CP receiving circuit 1013. The CP receiving circuit 1013 is a circuit receiving a control pilot signal transmitted from the power supply apparatus 2. Then, in accordance with the transmission and reception of the control pilot signal, the power supply apparatus 2 performs charging control (e.g., SURFACE VEHICLE RECOMMENDED PRACTICE", J1772 February2012, Society of Automotive Engineers, Inc., October 1996 (Revised version, February 2012)). The control pilot signal is a signal of rectangular wave form. Then, in accordance with the potential of the rectangular wave signal relative to the reference potential, the presence or absence of the rectangular wave signal, and the like, the power supply apparatus 2 transmits and receives information concerning the charging such as the permission or non-permission of charging and the charging status.

Further, the PLC communication device 1014 connected individually to the control line 1001d and the reference potential line 1001c is mounted on the vehicle 1001. The PLC communication device 1014 superposes a differential signal having a higher frequency than the control pilot signal, for example, a differential signal of 2 to 30 MHz, onto the control pilot signal or, alternatively, separates a differential signal superposed on the control pilot signal so as to perform communication employing a differential signal. The power supply apparatus 2 transmits and receives the differential signal to and from the PLC communication device 1014 so as to be allowed to perform more advanced information communication than that performed by employing the control pilot signal.

As described above, the PLC communication device 1014 transmits and receives the differential signal through the control line 1001d and the reference potential line 1001c. The control line 1001d is connected to the PLC communication device 1014 having a given impedance. However, the reference potential line 1001c is connected to a body ground having a low impedance. Thus, in this configuration, the balance of the PLC communication device 1014 is unsatisfactory. Accordingly, a common mode noise generated in the control line 1001d and the reference potential line 1001c through the body ground or the like is converted into a noise of differential mode and then inputted to the PLC communication device 1014 as illustrated in FIG. 10. The PLC communication device 1014 performs communication by using a differential signal of 2 to 30 MHz. Thus, a noise of differential mode of 2 to 30 MHz is not allowed to be separated and removed. This has caused a problem of malfunctioning of the PLC communication device 1014.

Here, a method may be employed that a common-mode choke coil is provided in the control line 1001d and the reference potential line 1001c so that the malfunctioning of the PLC communication device 1014 is avoided. However, in some cases, the noise generated in the control line 1001d and the reference potential line 1001c is not allowed to be effectively removed. This is expected to be because a part of the common mode noise generated in the control line 1001d and the reference potential line 1001c is not removed by the common-mode choke coil and is converted into a noise of differential mode so as to be inputted to the PLC communication device 1014.

SUMMARY

The present invention has been devised in view of such situations. An object thereof is to provide a communication system in which a noise converted from a common mode into a differential mode and then inputted to a PLC communication device is reduced so that malfunctioning of the PLC communication device is avoidable. Further, another object is to provide a connector constituting the communication system.

A communication system according to an aspect of the present invention is a communication system comprising: a control line transmitting a control signal for controlling charging of a battery mounted on a vehicle; a reference potential line connected to a reference potential of the vehicle serving as a reference for the control signal; a communication device connected to the control line and the reference potential line and superposing onto the control signal a differential signal having a higher frequency than the control signal so as to perform communication with an external power supply apparatus; and an inductive element which is provided at a point of connection between the reference potential line and the reference potential or provided in the reference potential line and the inductive element having impedance for a noise having a higher frequency than the control signal is higher than the impedance for the control signal.

A connector according to an aspect of the present invention is a connector provided with a control line transmitting a control signal for controlling charging of a battery mounted on a vehicle and with a reference potential line connected to a reference potential of the vehicle serving as a reference for the control signal, so as to connect the control line and the reference potential line to a charging cable of an external power supply apparatus, comprising: a second reference potential line branching off from the reference potential line; and an inductive element which is provided in the second reference potential line and the inductive element having impedance for a noise having a higher frequency than the control signal is higher than the impedance for the control signal.

The configurations described above are allowed to provide: a communication system and a connector in which a noise converted from a common mode into a differential mode and then inputted to a PLC communication device is reduced so that malfunctioning of the PLC communication device is avoidable.

DETAILED DESCRIPTION

Figure 1:
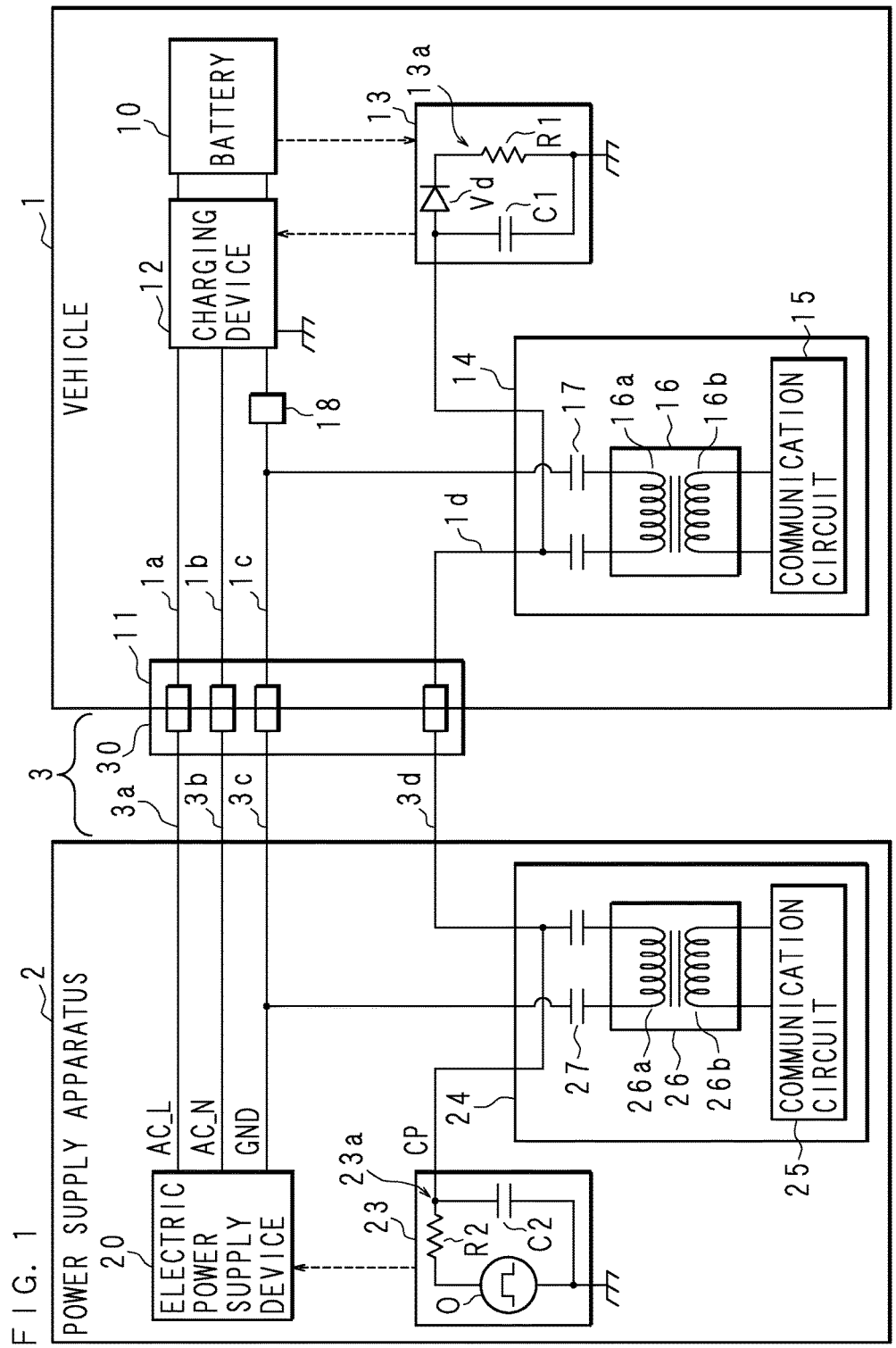
FIG. 1 is a circuit block diagram illustrating an exemplary configuration of a communication system according to Embodiment 1.

First, aspects of the present invention are listed and described below. Further, at least a part of the embodiments described below may arbitrarily be combined with each other.

(1) A communication system according to an aspect of the present invention is a communication system comprising: a control line transmitting a control signal for controlling charging of a battery mounted on a vehicle; a reference potential line connected to a reference potential of the vehicle serving as a reference for the control signal; a communication device connected to the control line and the reference potential line and superposing onto the control signal a differential signal having a higher frequency than the control signal so as to perform communication with an external power supply apparatus; and an inductive element which is provided at a point of connection between the reference potential line and the reference potential or provided in the reference potential line and the inductive element having impedance for a noise having a higher frequency than the control signal is higher than the impedance for the control signal.

The inductive element is provided at the point of connection between the reference potential line and the reference potential or provided in the reference potential line. In the inductive element, the impedance for a noise having a higher frequency than the control signal is higher than the impedance for the control signal. Thus, as for the noise, the balance of the communication device connected to the control line and the reference potential line is better than that of a device not provided with the inductive element. Thus, a situation is suppressed that a common mode noise generated in the control line and the reference potential line is converted into a differential mode noise. Accordingly, malfunctioning of the communication device caused by the differential mode noise is avoidable.

(2) A configuration is preferable that the communication system comprises a connector for connecting the control line and the reference potential line to a charging cable of the external power supply apparatus, wherein the inductive element is arranged inside the connector.

The inductive element is arranged inside the connector. Thus, a situation is allowed to be avoided that the inductive element goes into contact with an internal structure of the vehicle owing to the shakiness or the vibration of the vehicle so as to be damaged.

(3) A configuration is preferable that the communication system comprises a second reference potential line branching off from the reference potential line, wherein the inductive element is provided in the second reference potential line, and wherein the connector includes: a circuit board holding the inductive element; and a cover made of resin and covering the circuit board holding the inductive element.

The inductive element is held on the circuit board and covered by the cover made of resin. Thus, a situation is allowed to be more effectively avoided that the inductive element goes into contact with an internal structure of the vehicle owing to the shakiness or the vibration of the vehicle so as to be damaged.

(4) A configuration is preferable that the connector includes: a filter separating the differential signal from the control signal; and a coupling transformer connected to the filter, and wherein the cover is constructed such as to cover the filter and the coupling transformer.

The inductive element, the filter, and the coupling core held on the circuit board are covered by the cover. Thus, a situation is allowed to be more effectively avoided that each electronic component goes into contact with an internal structure of the vehicle owing to the shakiness or the vibration of the vehicle so as to be damaged.

Further, the filter and the coupling core performing superposition and separation of the differential signal are arranged at a position closer to the power supply apparatus and then the inductive element is provided in a vicinity of the filter and the coupling core. Thus, a possibility is reduced that a common mode noise generated in the control line and the reference potential line is converted into a differential mode noise. Accordingly, the malfunctioning of the communication device caused by the differential mode noise is allowed to be more effectively avoided.

(5) A configuration is preferable that the communication system comprises a receiving circuit connected to the control line so as to receive a control signal transmitted from the external power supply apparatus.

(6) A configuration is preferable that the communication system comprises a second inductive element which is provided in a wire connecting the receiving circuit to the reference potential and the second inductive element having impedance for a noise having a higher frequency than the control signal is higher than the impedance for the control signal.

The second inductive element is provided in the wire connecting the receiving circuit to the reference potential. In the second inductive element, the impedance for a noise having a higher frequency than the control signal is higher than the impedance for the control signal. Thus, as for the noise, the balance of the communication device connected to the control line and the reference potential line is better than that of a device not provided with the first and the second inductive element. Thus, a situation is suppressed that a common mode noise generated in the control line and the reference potential line is converted into a differential mode noise. Accordingly, the malfunctioning of the communication device caused by the differential mode noise is allowed to be more effectively avoided.

(7) A connector according to an aspect of the present invention is a connector provided with a control line transmitting a control signal for controlling charging of a battery mounted on a vehicle and with a reference potential line connected to a reference potential of the vehicle serving as a reference for the control signal, so as to connect the control line and the reference potential line to a charging cable of an external power supply apparatus, comprising: a second reference potential line branching off from the reference potential line; and an inductive element which is provided in the second reference potential line and the second inductive element having impedance for a noise having a higher frequency than the control signal is higher than the impedance for the control signal.

The inductive element is provided at the point of connection between the reference potential line and the reference potential or provided in the reference potential line. In the inductive element, the impedance for a noise having a higher frequency than the control signal is higher than the impedance for the control signal. Thus, as for the noise, the balance of the communication device connected to the control line and the reference potential line is better than that of a device not provided with the inductive element. Thus, a situation is suppressed that a common mode noise generated in the control line and the reference potential line is converted into a differential mode noise. Accordingly, malfunctioning of the communication device caused by the differential mode noise is avoidable.

Further, the inductive element is arranged inside the connector. Thus, a situation is allowed to be avoided that the inductive element goes into contact with an internal structure of the vehicle owing to the shakiness or the vibration of the vehicle so as to be damaged.

Detailed examples of the communication system and the connector according to the embodiments of the present invention are described below with reference to the drawings. Here, the present invention is not limited to these exemplifications and intended to include all changes within the scope of the claims and the scope or the meaning equivalent thereto. Further, at least a part of the embodiments described below may be arbitrarily combined together.

Embodiment 1

FIG. 1 is a circuit block diagram illustrating an exemplary configuration of a communication system according to Embodiment 1.

The communication system of Embodiment 1 includes: a vehicle 1 such as a plug-in hybrid electric vehicle and an electric vehicle; and a power supply apparatus 2 supplying electric power through a charging cable 3 to a battery 10 of the vehicle 1.

In the charging cable 3, one end part thereof is connected to the power supply apparatus 2 and then a charging gun 30 is provided in the other end part of the charging cable 3. The charging cable 3 includes: two power feed lines 3a and 3b; a reference potential line 3c; a control line 3d; and a connection detection line (not illustrated) detecting the connection of the charging gun 30 to the vehicle 1. The power feed lines 3a and 3b are lead wires on which a voltage of alternating current outputted from the power supply apparatus 2 is applied. The control line 3d is a lead wire transmitting a control pilot signal (a control signal) for controlling the charging of the battery 10 mounted on the vehicle 1. The reference potential line 3c is a lead wire connected to a reference potential such as the body ground of the vehicle 1 serving as a reference for the control pilot signal. Further, as described later, the control line 3d and the reference potential line 3c serve also as a transmission medium of a differential signal.

The charging gun 30 includes: a grip part of gun grip shape; a plug; an insertion guide used for connection to the connector 11 of the vehicle 1; and a latch locking with the vehicle 1. The plug of the charging gun 30 has a shape allowed to be connected to the connector 11 of the vehicle 1. Then, the plug includes: AC supply terminals outputting the alternating current supplied from the power supply apparatus 2; a common potential terminal connecting to the reference potential; a control pilot signal terminal through which the control pilot signal is inputted and outputted; and connection detecting terminal.

The power supply apparatus 2 includes an electric power supply device 20, a second charging control device 23, and a second PLC communication device 24. The electric power supply device 20 is connected to one end part of each of the power feed lines 3a and 3b and the reference potential line 3c. Then, the electric power supply device 20 supplies an alternating current through the power feed lines 3a and 3b to the vehicle 1. The operation of the electric power supply device 20 is controlled by the second charging control device 23.

The second charging control device 23 includes a CP transmitting circuit 23a and a microcomputer (not illustrated). The CP transmitting circuit 23a is connected to the control line 3d. Then, the CP transmitting circuit 23a transmits and receives the control pilot signal controlling the charging of the battery 10 mounted on the vehicle 1. For example, the control pilot signal is a rectangular wave signal of 1 kHz. Then, in accordance with the potential of the rectangular wave signal relative to the reference potential, the presence or absence of the rectangular wave signal, and the like, the second charging control device 23 transmits and receives information concerning the charging such as the confirmation of connection between the power supply apparatus 2 and the vehicle 1, the permission or non-permission of charging, and the charging status.

Specifically, the CP transmitting circuit 23*a* includes: a capacitor C2; a resistor R2; and an oscillation circuit O outputting a rectangular wave signal. One terminal of the oscillation circuit O is connected to the reference potential and the other terminal is connected to one end of the resistor R2. The other end of the resistor R2 is connected to one end of the capacitor C2 and the other end of the capacitor C2 is connected to the reference potential. One end of the control line 3*d* is connected to the other end of the resistor R2. A microcomputer of the second charging control device 23 controls the operation of the oscillation circuit O so as to transmit the control pilot signal. Further, the second charging control device 23 includes a voltage detection circuit detecting the voltage of the control pilot signal applied on the control line 3*d*. Then, the microcomputer acquires through the voltage detection circuit information outputted from the vehicle 1 and then controls the operation of the electric power supply device 20.

The second PLC communication device 24 is connected individually to the control line 3*d* and the reference potential line 3*c* and then transmits and receives information concerning the charging, to and from the vehicle 1 through the control line 3*d* and the reference potential line 3*c*. The second PLC communication device 24 performs communication with the vehicle 1 by superposing on the control pilot signal a differential signal having a higher frequency than the control pilot signal, for example, a differential signal of 2 to 30 MHz.

Specifically, the second PLC communication device 24 includes: coupling capacitors 27 and a coupling transformer 26 separating from the control pilot signal the differential signal superposed on the control pilot signal; and a communication circuit 25 transmitting and receiving the differential signal.

Two branch lines each branching off from the control line 3*d* or the reference potential line 3*c* are connected through the coupling capacitors 27 to the coupling transformer 26. Each coupling capacitor 27 has a high impedance for the control pilot signal and has a low impedance for the differential signal. For example, the coupling capacitor 27 is constructed from a capacitor having an electrostatic capacitance of 1 nF.

The coupling transformer 26 includes a primary coil 26*a* and a secondary coil 26*b* magnetically coupled to the primary coil 26*a*. The two branch lines are connected through the coupling capacitors 27 to both ends of the primary coil 26*a*. Both ends of the secondary coil 26*b* are connected to the communication circuit 25. The communication circuit 25 includes a band pass filter cutting off a signal outside the frequency band of the differential signal and thereby receives the differential signal having been separated by the coupling capacitors 27 and the coupling transformer 26 and then having passed through the band pass filter. Further, the communication circuit 25 provides a to-be-transmitted signal to the secondary coil 26*b* so as to transmit a differential signal.

The vehicle 1 includes a battery 10, a connector 11, a charging device 12, a first charging control device 13, a first PLC communication device (a communication device) 14, and an inductive element 18.

The connector 11 is provided as a power feed port at a suitable point of the vehicle 1. Then, when the plug of the charging gun 30 is connected to the connector 11, the vehicle 1 is connected through the charging cable 3 to the power supply apparatus 2. The connector 11 includes connection parts individually connected to the individual connection terminals of the plug. Then, each connection part is connected to one end part of each of power feed lines 1*a* and 1*b*, a reference potential line 1*c*, and a control line 1*d* which constitute internal wires. That is, when the plug of the charging gun 30 is connected to the connector 11, the connection terminals of the plug are electrically connected to the connection parts of the connector 11 so that the power feed lines 3*a* and 3*b*, the reference potential line 3*c*, and the control line 3*d* of the charging cable 3 are connected to the power feed lines 1*a* and 1*b*, the reference potential line 1*c*, and the control line 1*d* inside the vehicle 1.

The charging device 12 is connected to the other end part of each of the power feed lines 1*a* and 1*b* and the reference potential line 1*c*. The charging device 12 is a device converting the alternating current supplied from the power supply apparatus 2 through the power feed lines 1*a*, 1*b*, 3*a*, and 3*b* into a direct current, and then performing the charging of the battery 10. The operation of the charging device 12 is controlled by the first charging control device 13. The reference potential line 1*c* arranged inside the vehicle 1 is connected through the charging device 12 to the reference potential. For example, the reference potential is the body ground.

The inductive element 18 is provided in the reference potential line 1*c*. Specifically, the inductive element 18 is provided on the charging device 12 side relative to a point where the branch line branches off from the reference potential line 1*c* to the first PLC communication device 14. The impedance of the inductive element 18 for a noise of high frequency is higher than the impedance of the inductive element 18 for the control pilot signal. The high frequency mentioned here indicates a higher frequency than the frequency of the control pilot signal. For example, the inductive element 18 is a choke coil inserted into the reference potential line 1*c*. For example, the capacity of the inductive element 18 is 50 µH.

Here, the above-described position where the inductive element 18 is provided is exemplary. That is, the inductive element 18 may be provided in the wire connecting the charging device 12 to the reference potential. Further, the inductive element 18 may be provided in the reference potential line 1*c* arranged inside the charging device 12.

The first charging control device 13 includes a CP receiving circuit (a receiving circuit) 13*a* and a microcomputer (not illustrated). The CP receiving circuit 13*a* is connected to the other end part of the control line 1*d* going through the first PLC communication device 14. Then, the CP receiving circuit 13*a* transmits and receives the control pilot signal controlling the charging of the battery 10 mounted on the vehicle 1. Then, in accordance with the potential of the rectangular wave signal relative to the reference potential, the presence or absence of the rectangular wave signal, and the like, the first charging control device 13 transmits and receives information concerning the charging such as the confirmation of connection between the power supply apparatus 2 and the vehicle 1, the permission or non-permission of charging, and the charging status.

Specifically, the CP receiving circuit 13*a* includes a capacitor C1, a resistor R1, and a diode Vd. The other end part of the control line 1*d* is connected to the anode of the diode Vd and one end of the capacitor C1. Then, the other end of the capacitor C1 is connected to the reference potential. The cathode of the diode Vd is connected to one end of the resistor R1 and then the other end of the resistor R1 is connected to the reference potential. For example, the resistor R1 is a variable resistor. Then, the microcomputer of the first charging control device 13 changes the resistance of the resistor R1 so as to control the potential of the control pilot signal and thereby transmits the information concerning the charging control to the power supply apparatus 2. Further, the first charging control device 13 includes a voltage detection circuit detecting the voltage of the control pilot signal applied on the control line 1d. Then, the microcomputer acquires through the voltage detection circuit the information outputted from the vehicle 1 and then controls the operation of the charging device 12.

The first PLC communication device 14 is connected individually to the control line 1d and the reference potential line 1c and then transmits and receives the information concerning the charging, to and from the power supply apparatus 2 through the control line 1d and 3d and the reference potential line 1c and 3c. The first PLC communication device 14 performs communication with the vehicle 1 by superposing on the control pilot signal a differential signal having a higher frequency than the control pilot signal.

Specifically, the first PLC communication device 14 includes: coupling capacitors (a filter) 17 and a coupling transformer 16 separating from the control pilot signal the differential signal superposed on the control pilot signal; and a communication circuit 15 transmitting and receiving the differential signal.

Two branch lines each branching off from the control line 1d or the reference potential line 1c are connected through the coupling capacitors 17 to the coupling transformer 16. Each coupling capacitor 17 has a high impedance for the control pilot signal and has a low impedance for the differential signal.

The coupling transformer 16 includes a primary coil 16a and a secondary coil 16b magnetically coupled to the primary coil 16a. The two branch lines are connected through the coupling capacitors 17 to both ends of the primary coil 16a. Both ends of the secondary coil 16b are connected to the communication circuit 15. The communication circuit 15 includes a band pass filter cutting off a signal outside the frequency band of the differential signal and thereby receives the differential signal having been separated by the coupling capacitors 17 and the coupling transformer 16 and then having passed through the band pass filter. Further, the communication circuit 15 provides a to-be-transmitted signal to the secondary coil 16b so as to transmit a differential signal.

According to the communication system having this configuration, by virtue of the inductive element 18 provided in the reference potential line 1c, the balance of the first and the second PLC communication device 14 and 24 for a noise in the same frequency band as the differential signal becomes better than that of a device not provided with the inductive element 18. Thus, a situation is allowed to be suppressed that a common mode noise generated in the control line 1d or 3d and the reference potential line 1c or 3c is converted into a differential mode noise. Accordingly, a noise converted from a common mode into a differential mode and then inputted to the first PLC communication device 14 is reduced so that malfunctioning of the first PLC communication device 14 is avoidable.

Further, a radiated noise is allowed to be reduced.

Figure 2:
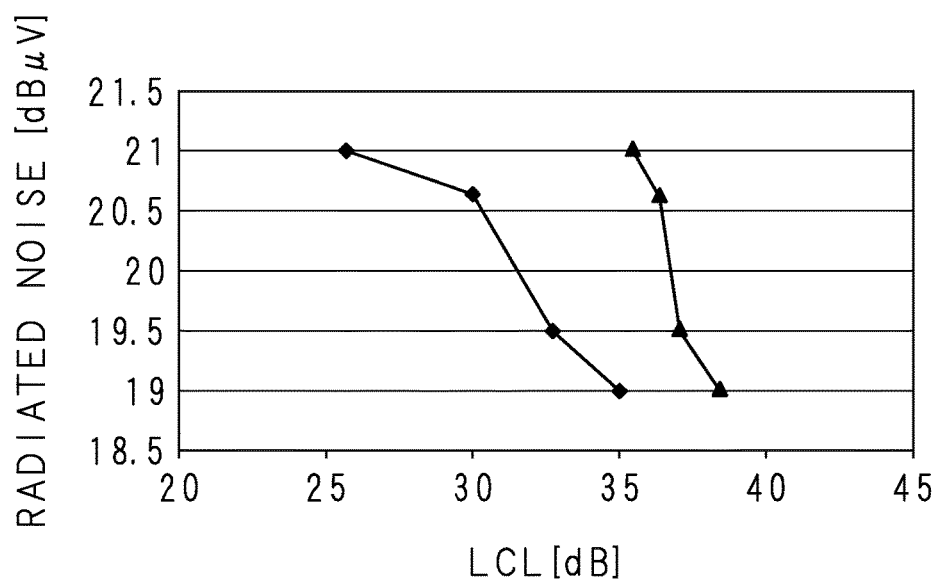
FIG. 2 is a graph representing a relation between a longitudinal conversion loss and a radiated noise.

FIG. 2 is a graph representing a relation between the longitudinal conversion loss and the radiated noise. The horizontal axis indicates the longitudinal conversion loss (LCL) of the first and the second PLC communication device 14 and 24 and the vertical axis indicates the actual measurement value of the radiated noise. The graph of rhombus plot indicates the radiated noise in a case that the charging gun 30 has been extracted. The graph of triangular plot indicates the radiated noise in a case that the charging gun 30 has been inserted. As obviously recognized from the actual measurement values of the radiated noise represented in the graph of FIG. 2, the radiated noise decreases with improving balance of the first and the second PLC communication device 14 and 24. As such, by virtue of the inductive element 18 inserted into the reference potential line 1c, malfunctioning of the first PLC communication device 14 is avoided and, at the same time, a radiated noise is allowed to be reduced.

Embodiment 2

Figure 3:
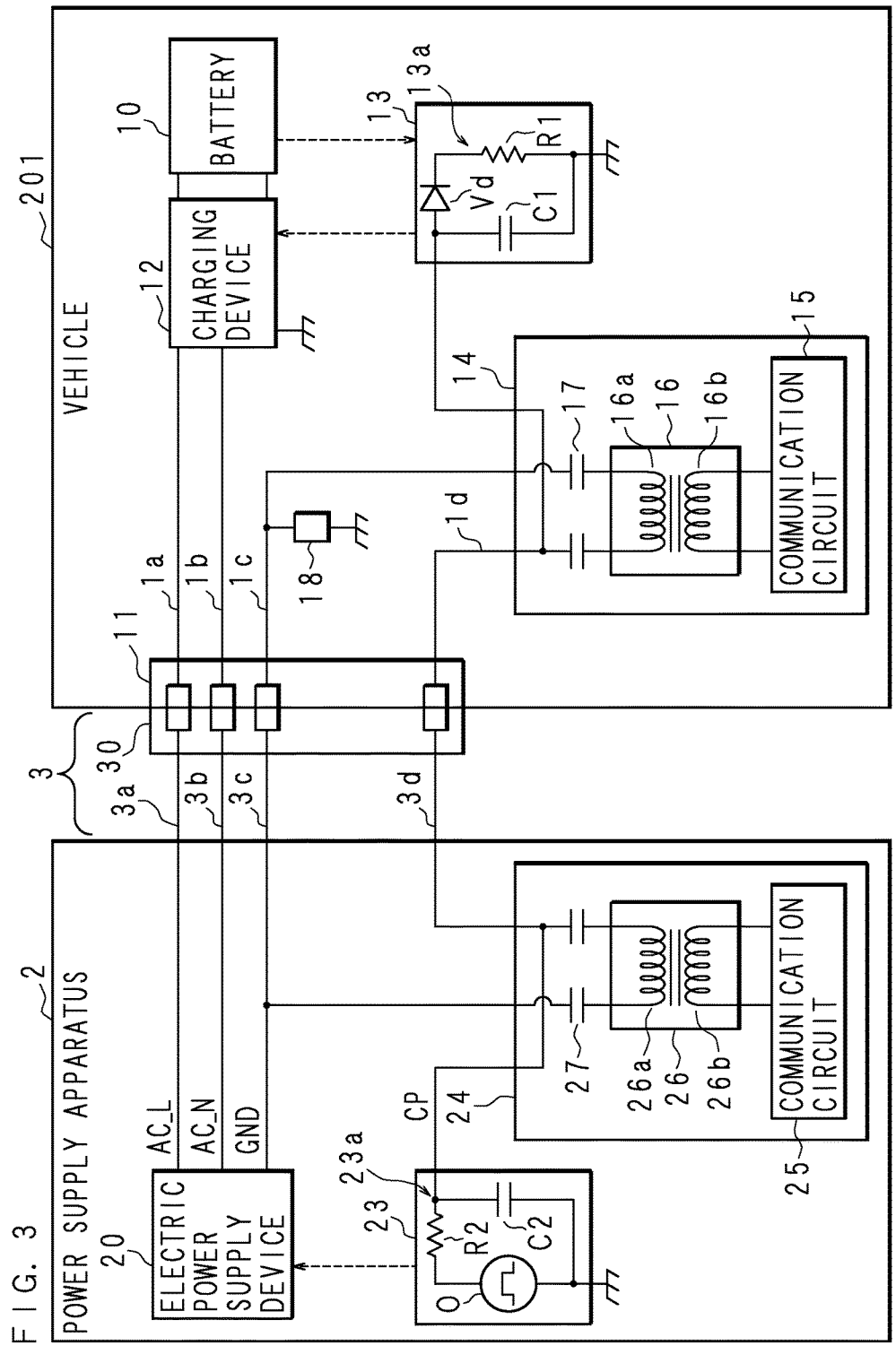
FIG. 3 is a circuit block diagram illustrating an exemplary configuration of a communication system according to Embodiment 2.

FIG. 3 is a circuit block diagram illustrating an exemplary configuration of a communication system according to Embodiment 2. In the communication system according to Embodiment 2, the wire configuration alone of the reference potential line 1c and the inductive element 18 is different from that of Embodiment 1. Thus, the following description is given mainly for this difference.

One end part of the reference potential line 1c arranged inside the vehicle 201 is connected to the connector 11 and the other end part is connected to the first PLC communication device 14. The branch line branching off from the reference potential line 1c of Embodiment 2 is connected to the reference potential. That is, the reference potential line 1c according to Embodiment 1 has been connected through the charging device 12 to the reference potential. In contrast, the reference potential line 1c according to Embodiment 2 is connected to the reference potential without the intervention of the charging device 12. The inductive element 18 is inserted into the branch line branching off from the reference potential line 1c.

Similarly to Embodiment 1, in the communication system according to Embodiment 2, a noise converted from a common mode into a differential mode and then inputted to the first PLC communication device 14 is reduced so that malfunctioning of the first PLC communication device 14 is avoidable. In particular, in Embodiment 2, since the length of the reference potential line 1c arranged inside the vehicle 201 is short, a possibility is allowed to be reduced that a noise is caused in the reference potential lines 1c and 3c and the control lines 1d and 3d. Thus, the malfunctioning of the first PLC communication device 14 caused by the noise is allowed to be more effectively avoided.

Embodiment 3

Figure 4:
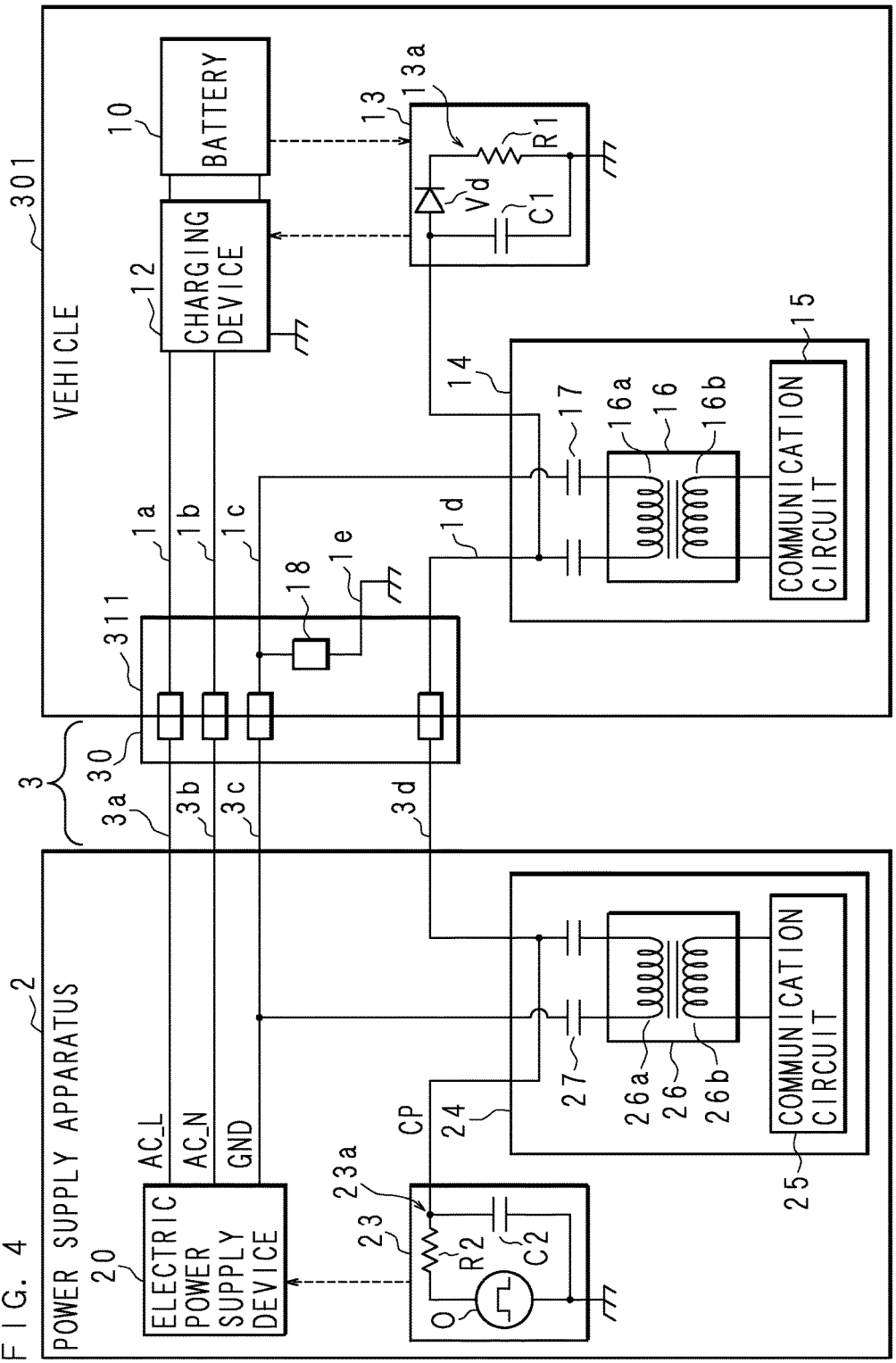
FIG. 4 is a circuit block diagram illustrating an exemplary configuration of a communication system according to Embodiment 3.

FIG. 4 is a circuit block diagram illustrating an exemplary configuration of a communication system according to Embodiment 3. In the communication system according to Embodiment 3, the wire configuration of the reference potential line 1c and the inductive element 18 and the configuration of the connector 311 are alone different from those of Embodiment 1. Thus, the following description is given mainly for these differences.

One end part of the reference potential line 1c arranged inside the vehicle 301 is connected to the connector 311 and the other end part is connected to the first PLC communication device 14. The connector 311 includes a second reference potential line 1e branching off from the reference potential line 1c inside the connector 311. Then, the inductive element 18 is inserted into the second reference potential line 1e. The end part of the second reference potential line 1e is pulled from the connector 311 to the inside of the vehicle 301 and then connected to the reference potential.

Figure 5:
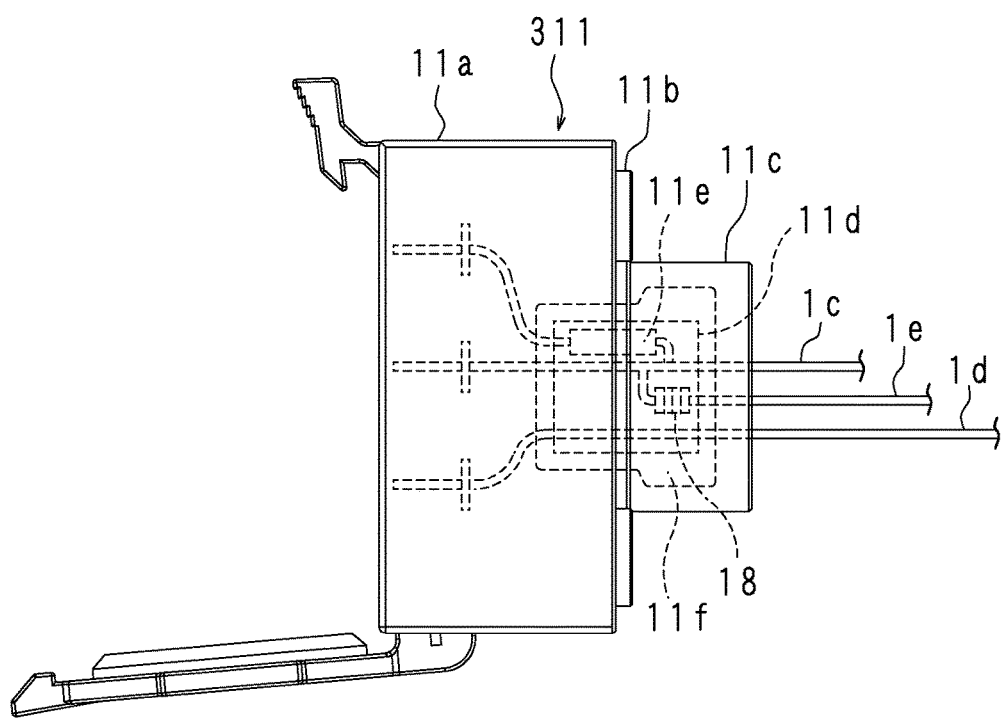
FIG. 5 is a schematic diagram illustrating a configuration of a connector according to Embodiment 3.

FIG. 5 is a schematic diagram illustrating the configuration of a connector 311 according to Embodiment 3. The connector 311 includes a container member 11a containing connection parts connected individually to the two power feed lines 1a and 1b, the control line 1d, the reference potential lines 1c and 1e arranged inside the vehicle. Here, in FIG. 5, for simplicity of the drawing, the two power feed lines 1a and 1b and the connection parts connected to the power feed lines 1a and 1b are not illustrated. The container member 11a includes an attaching part 11b attached to the vehicle 301. The attaching part 11b has a substantially rectangular plate shape. An attaching hole is formed in each of the four corners of the attaching part 11b so that the container member 11a is allowed to be attached at a given position of the vehicle 301 with screws or the like. A cylindrical part 11c having a cylinder shape protrudes from the center of one face of the attaching part 11b to the inner side of the vehicle 301. In the other face of the attaching part 11b, a plug connection part is provided which has a cylinder shape whose diameter is larger than the cylindrical part 11c and into which the plug of the charging gun 30 is inserted and connected at the time of charging. Further, in the plug connection part, an openable and closable lid part is provided such as to close the opening part.

A circuit board 11d is contained inside the container member 11a and the cylindrical part 11c. An end part of the connection part connected to the reference potential line 3c is fixed to the circuit board 11d. One end part of the reference potential line 1c is connected to the end part of the connection part on the circuit board 11d. Further, the inductive element 18 inserted into the second reference potential line 1e branching in the one end part of the reference potential line 1c is held on the circuit board 11d. Further, a detection circuit 11e detecting by using the connection detection line the connection of the charging gun 30 is also provided on the circuit board 11d. The inductive element 18, the detection circuit 11e, and the other various circuits are covered by a cover 11f made of resin. Specifically, the circuit board 11d is resin-molded. The cover 11f is held inside the container member 11a such as not to suffer from vibration.

According to the communication system and the connector 311 of Embodiment 3, the circuit board 11d on which the inductive element 18 is arranged is covered by the cover 11f made of resin and is held inside the container member 11a. Thus, a situation is allowed to be avoided that the inductive element 18 goes into contact with an internal structure of the vehicle 301 owing to the shakiness or the vibration of the vehicle 301 so as to be damaged. Further, operation effects similar to those of Embodiments 1 and 2 are obtained.

Embodiment 4

Figure 6:
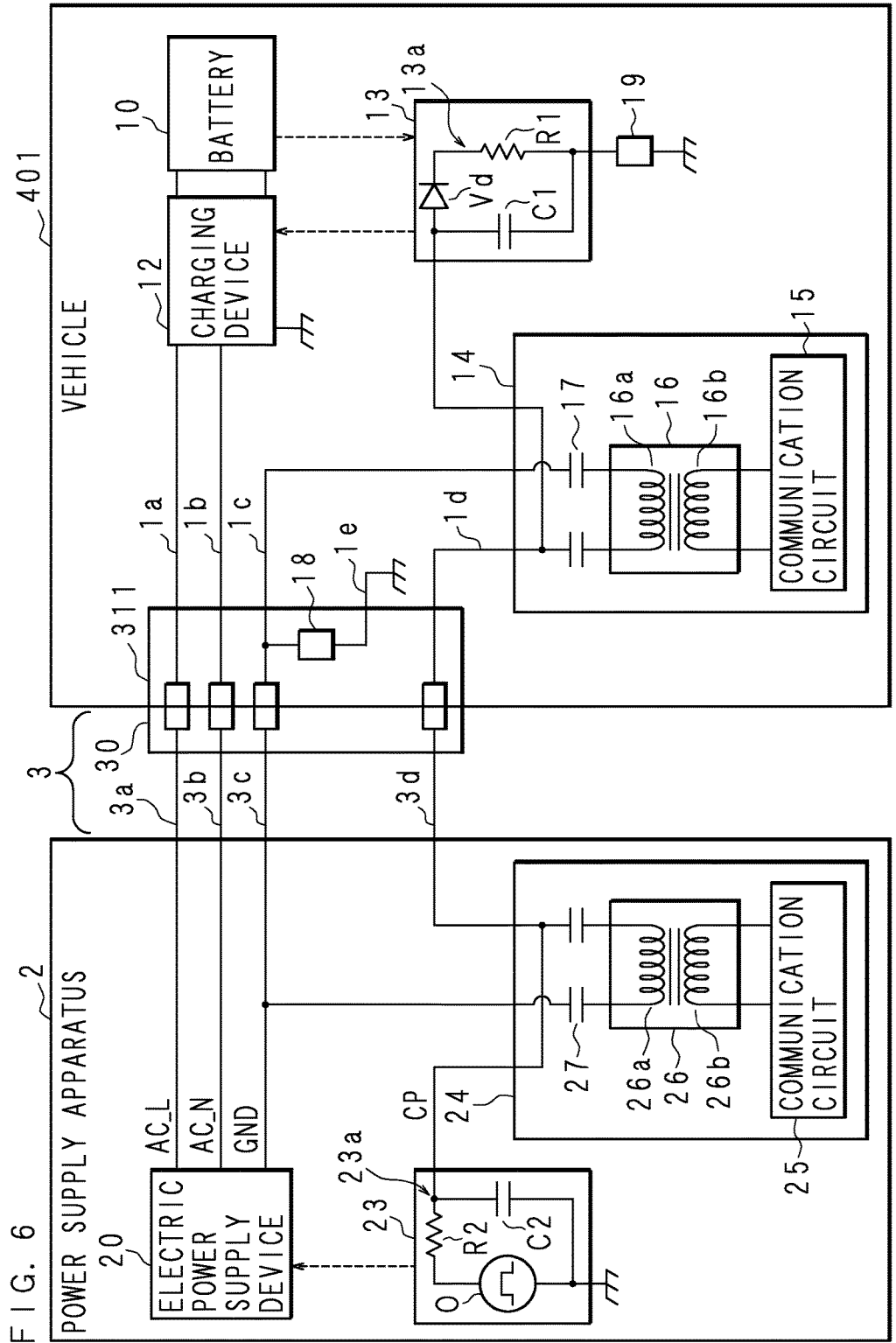
FIG. 6 is a circuit block diagram illustrating an exemplary configuration of a communication system according to Embodiment 4.

FIG. 6 is a circuit block diagram illustrating an exemplary configuration of a communication system according to Embodiment 4. In the communication system according to Embodiment 4, a configuration that a second inductive element 19 is provided in the first charging control device 13 is different from that of Embodiment 2. Thus, the following description is given mainly for this difference.

The first charging control device 13 mounted on a vehicle 401 according to Embodiment 4 is connected through the second inductive element 19 to the reference potential. That is, the second inductive element 19 is inserted into the wire connecting the low-voltage side terminals of the capacitor C1 and the resistor R1 to the reference potential. Similarly to the first inductive element 18, also in the second inductive element 19, the impedance for a noise having a higher frequency than the control pilot signal is higher than the impedance for the control pilot signal.

According to the communication system of Embodiment 4, as for a noise in the same frequency band as the differential signal, the balance of the first and the second PLC communication device 14 and 24 each connected to the control line 1d or 3d and the reference potential line 1c or 3c becomes better than that of a device not provided with the second inductive element 19. Accordingly, a noise converted from a common mode into a differential mode and then inputted to the first PLC communication device 14 is reduced so that the malfunctioning of the first PLC communication device 14 is allowed to be more effectively avoided.

Embodiment 5

Figure 7:
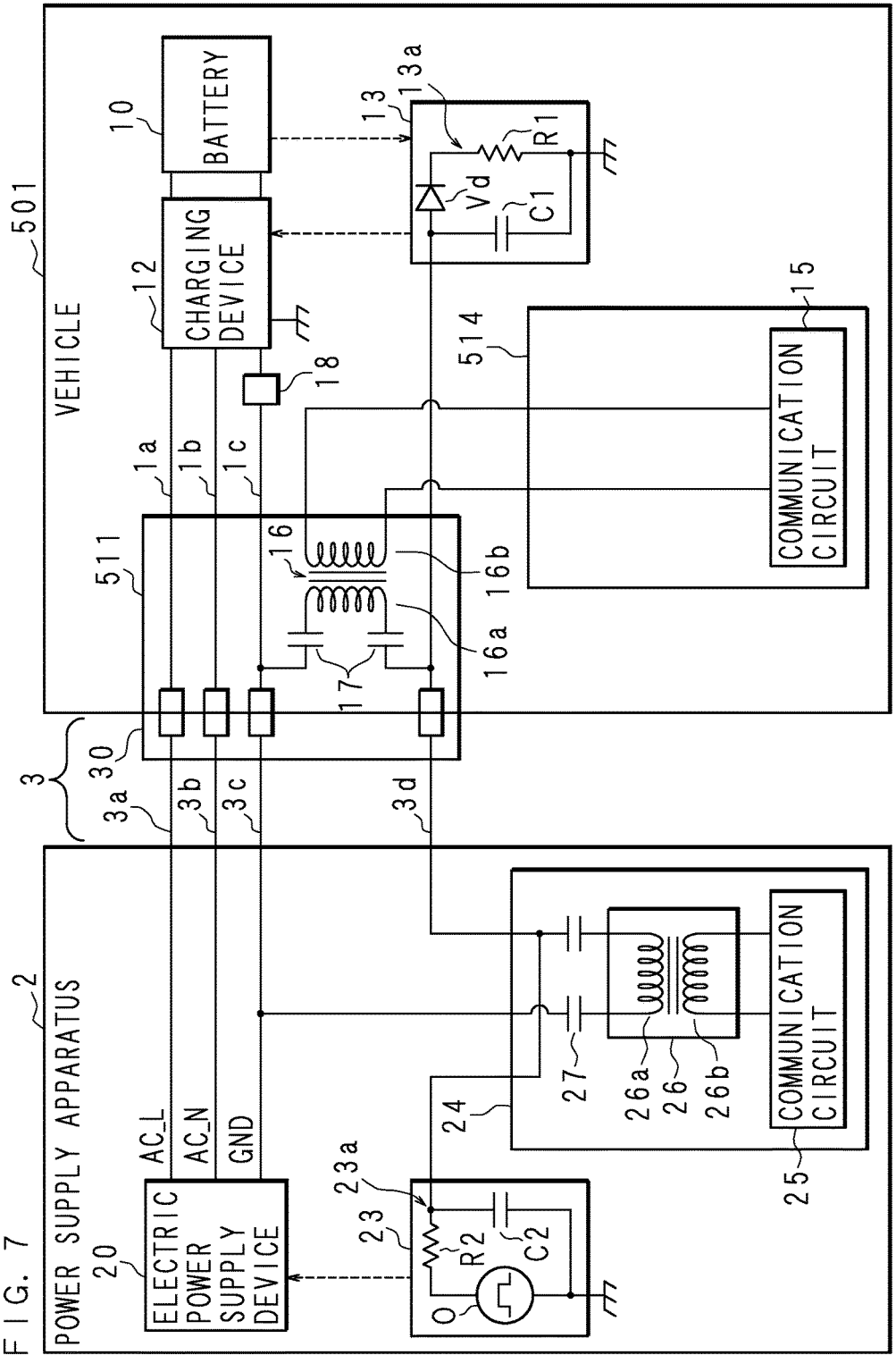
FIG. 7 is a circuit block diagram illustrating an exemplary configuration of a communication system according to Embodiment 5.

FIG. 7 is a circuit block diagram illustrating an exemplary configuration of a communication system according to Embodiment 5. In the communication system according to Embodiment 5, the configurations of a first PLC communication device 514 and a connector 511 are different from those of Embodiment 1. Thus, the following description is given mainly for these differences.

In the connector 511 provided in a vehicle 501 according to Embodiment 5, coupling capacitors 17 and a coupling transformer 16 are provided inside. That is, the coupling capacitors 17 and the coupling transformer 16 having been provided in the first PLC communication device 14 in Embodiment 1 are provided in the connector 511. The first PLC communication device 514 includes the communication circuit 15 connected to the coupling transformer 16 of the connector 511. Similarly to Embodiment 3, the coupling capacitors 17 and the coupling transformer 16 are arranged on the circuit board and then the circuit board is covered by a cover made of resin.

Specifically, two branch lines each branching off from the control line 1d or the reference potential line 1c are connected through the coupling capacitors 17 to the coupling transformer 16. Each coupling capacitor 17 has a high impedance for the control pilot signal and has a low impedance for the differential signal. The coupling transformer 16 includes a primary coil 16a and a secondary coil 16b magnetically coupled to the primary coil 16a. The two branch lines are connected through the coupling capacitors 17 to both ends of the primary coil 16a. One end part of each of the two wires is connected to each end of the secondary coil 16b. Then, the other end parts of the two wires are connected to the communication circuit 15 of the first PLC communication device 14.

The communication system according to Embodiment 5 has operation effects similar to those of Embodiment 1.

Embodiment 6

Figure 8:
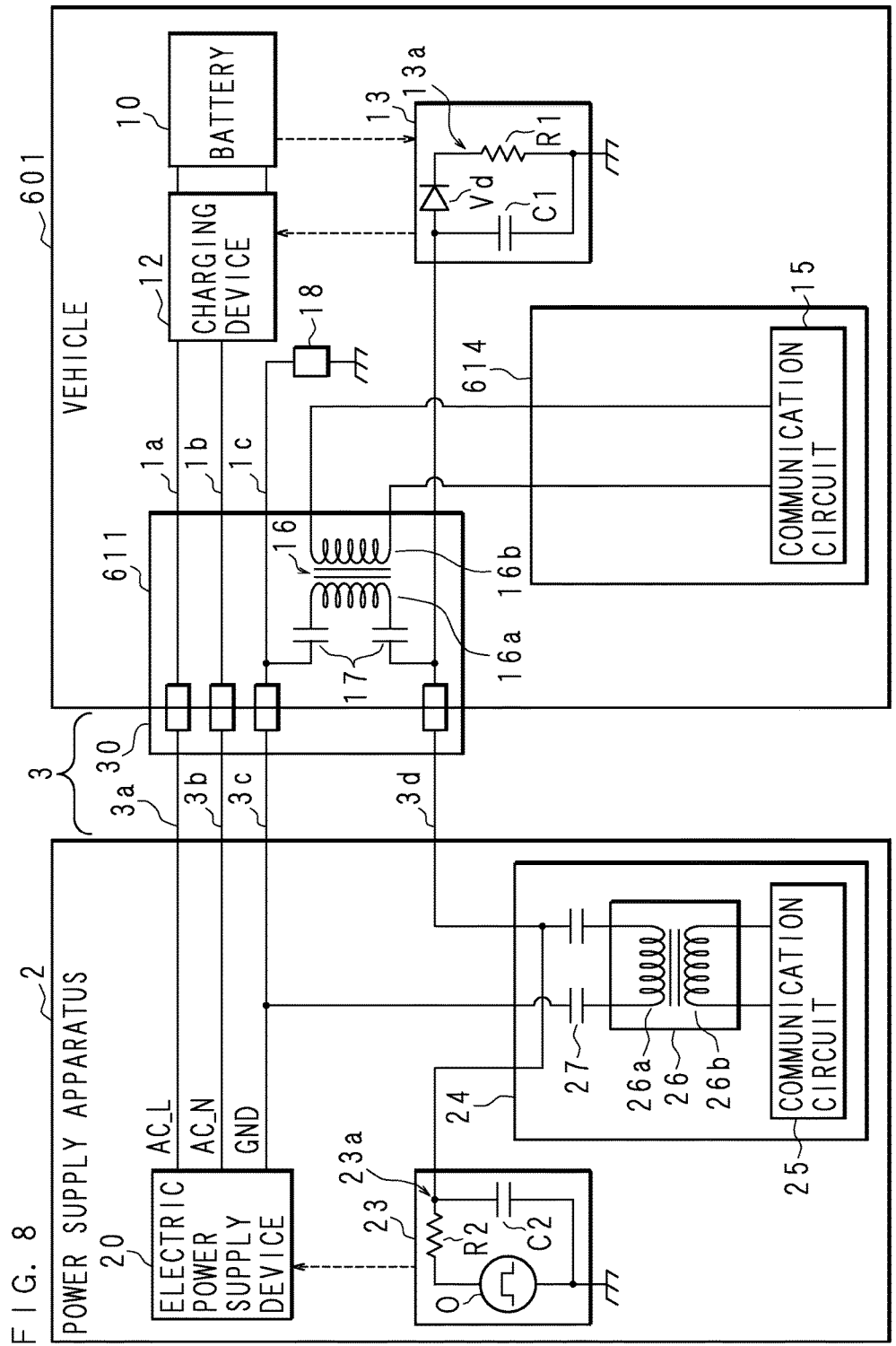
FIG. 8 is a circuit block diagram illustrating an exemplary configuration of a communication system according to Embodiment 6.

FIG. 8 is a circuit block diagram illustrating an exemplary configuration of a communication system according to Embodiment 6. In the communication system according to Embodiment 6, the configurations of a first PLC communication device 614 and a connector 611 are different from those of Embodiment 2. Thus, the following description is given mainly for these differences.

In the connector 611 provided in a vehicle 601 according to Embodiment 6, coupling capacitors 17 and a coupling transformer 16 are provided inside. That is, the coupling capacitors 17 and the coupling transformer having been provided in the first PLC communication device 614 in Embodiment 2 are provided in the connector 611. The first PLC communication device 14 includes the communication circuit 15 connected to the coupling transformer of the connector 611. The configuration of the coupling capacitors 17 and the coupling transformer is similar to that of Embodiment 5. Thus, detailed description is not given.

The communication system according to Embodiment 6 has operation effects similar to those of Embodiment 2.

Embodiment 7

Figure 9:
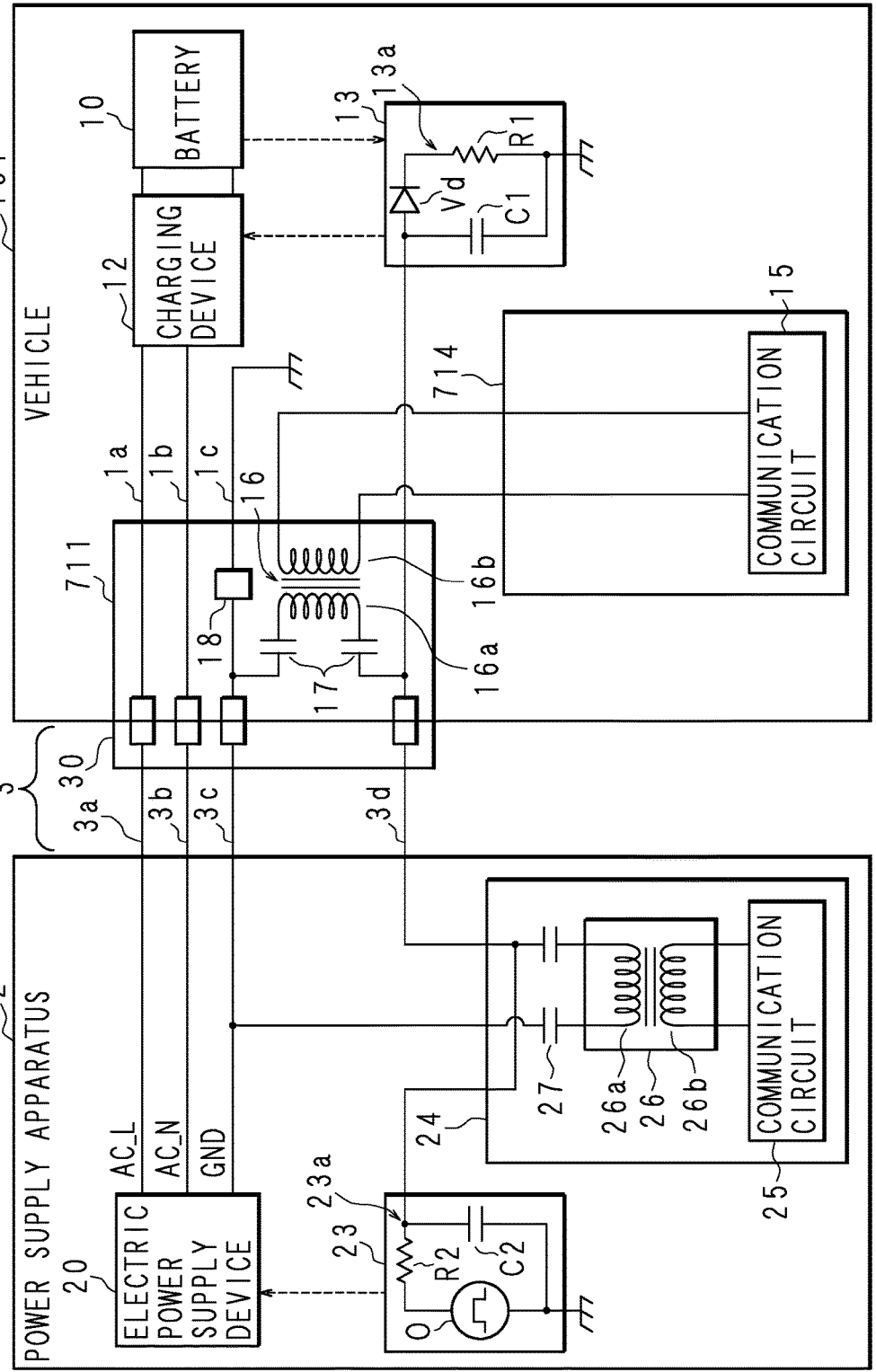
FIG. 9 is a circuit block diagram illustrating an exemplary configuration of a communication system according to Embodiment 7.
Figure 10:
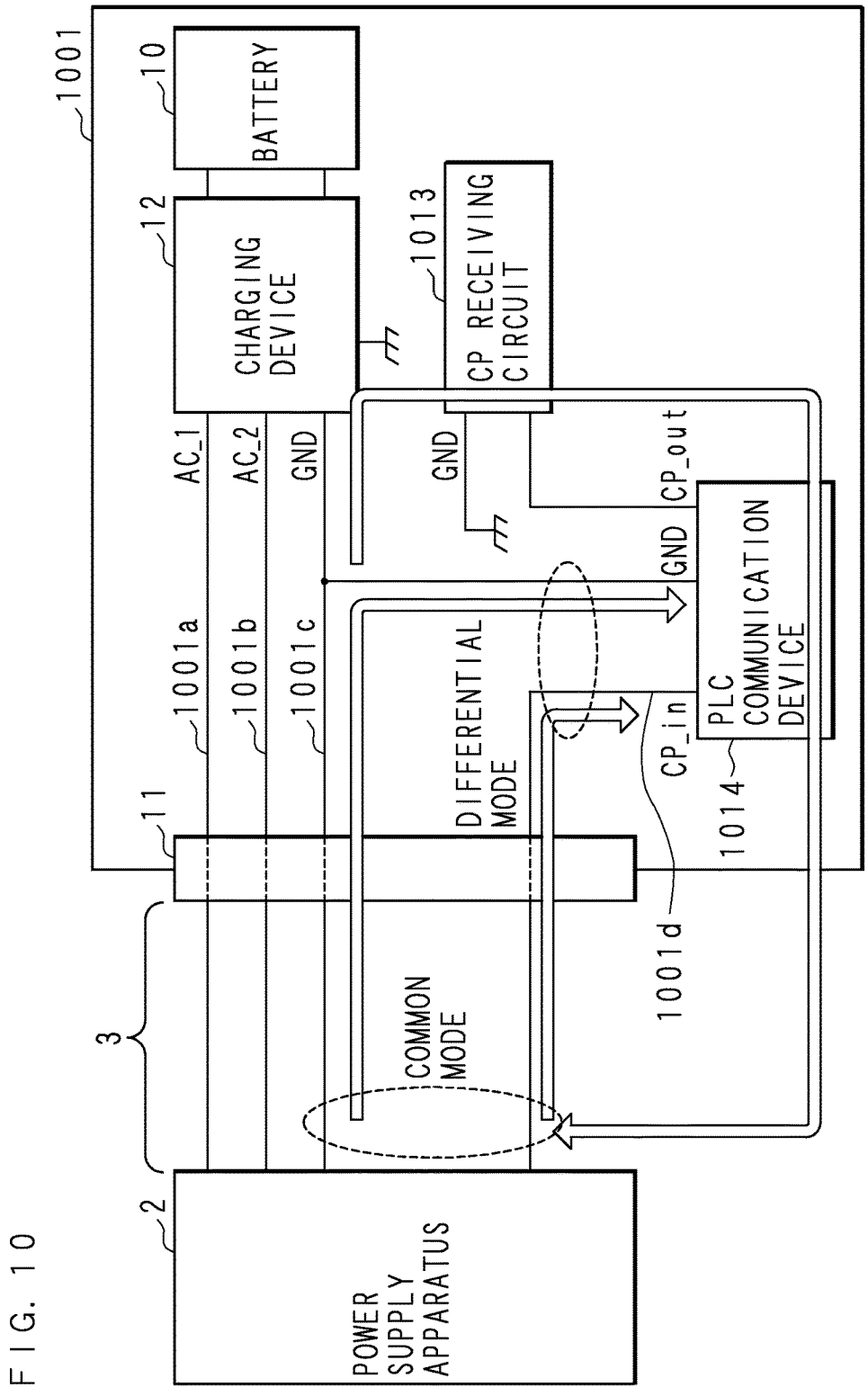
FIG. 10 is a block diagram illustrating a configuration of a vehicle connected to a power supply apparatus.

FIG. 9 is a circuit block diagram illustrating an exemplary configuration of a communication system according to Embodiment 7. In the communication system according to Embodiment 7, the configurations of a first PLC communication device 714 and a connector 711 are different from those of Embodiment 3. Thus, the following description is given mainly for these differences.

In the connector 711 provided in a vehicle 701 according to Embodiment 7, coupling capacitors 17 and a coupling transformer 16 are provided inside. That is, the coupling capacitors 17 and the coupling transformer 16 having been provided in the first PLC communication device 714 in Embodiment 3 are provided in the connector 711. The first PLC communication device 714 includes the communication circuit 15 connected to the coupling transformer 16 of the connector 711. The coupling capacitors 17 and the coupling transformer 16 together with the inductive element 18 are arranged on the circuit board 11*d* and then covered by the cover 11*f* made of resin. The other configuration of the coupling capacitors 17 and the coupling transformer 16 is similar to that of Embodiment 5. Thus, detailed description is not given.

The communication system and the connector 711 of Embodiment 7 have operation effects similar to those of Embodiments 1 to 3. Further, the coupling capacitors 17 and the coupling core performing superposition and separation of the differential signal are arranged at a position closer to the power supply apparatus 2 and then the inductive element 18 is provided in a vicinity of the coupling capacitors 17 and the coupling core. Thus, a possibility is reduced that a common mode noise generated in the control line 1*d* or 3*d* and the reference potential line 1*c* or 3*c* is converted into a differential mode noise. Accordingly, the malfunctioning of the first PLC communication device 714 caused by the differential mode noise is allowed to be more effectively avoided.

The embodiments disclosed above are to be regarded as exemplary at all points and as not restrictive. The scope of the present invention is defined by the scope of the claims rather than the above-described meaning and is intended to include all changes within the scope of the claims and the scope or the meaning equivalent thereto.

The invention claimed is:

1. A communication system comprising:
a control line transmitting a control signal for controlling charging of a battery mounted on a vehicle;
a reference potential line connected to a reference potential;
a communication device connected to the control line and the reference potential line serving as a transmission medium of a differential signal and superposing onto the control signal the differential signal having a higher frequency than the control signal so as to perform communication with an external power supply apparatus; and
an inductive element which is provided at a point of connection between the reference potential line and the reference potential or provided in the reference potential line, wherein an impedance of the inductive element for a noise is higher than an impedance of the inductive element for the control signal, the control signal having a lower frequency than the noise.

2. The communication system according to claim 1, comprising
a connector for connecting the control line and the reference potential line to a charging cable of the external power supply apparatus, wherein
the inductive element is arranged inside the connector.

3. The communication system according to claim 2, comprising
a second reference potential line branching off from the reference potential line, wherein
the inductive element is provided in the second reference potential line, and
wherein
the connector includes:
a circuit board holding the inductive element; and
a cover made of resin and covering the circuit board holding the inductive element.

4. The communication system according to claim 3, wherein
the connector includes:
a filter separating the differential signal from the control signal; and
a coupling transformer connected to the filter, and wherein
the cover is constructed such as to cover the filter and the coupling transformer.

5. The communication system according to claim 1, comprising
a receiving circuit connected to the control line so as to receive a control signal transmitted from the external power supply apparatus.

6. The communication system according to claim 5, comprising
a second inductive element which is provided in a wire connecting the receiving circuit to the reference potential and the second inductive element having impedance for a noise having a higher frequency than the control signal is higher than the impedance for the control signal.

7. A connector provided with a control line transmitting a control signal for controlling charging of a battery mounted on a vehicle and with a reference potential line connected to a reference potential, so as to connect the control line and the reference potential line to a charging cable of an external power supply apparatus, comprising:
a second reference potential line branching off from the reference potential line; and
an inductive element which is provided in the second reference potential line, wherein an impedance of the inductive element for a noise is higher than an impedance of the inductive element for the control signal, the control signal having a lower frequency than the noise.

* * * * *